April 15, 1930.  F. H. HALL  1,754,387
BRAKE ACTUATING MECHANISM
Filed Aug. 3, 1928
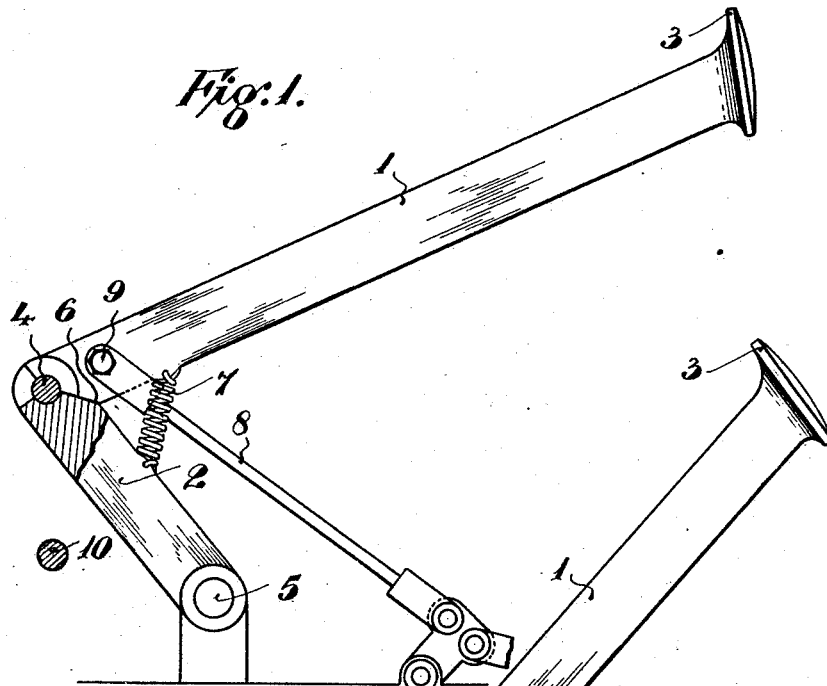
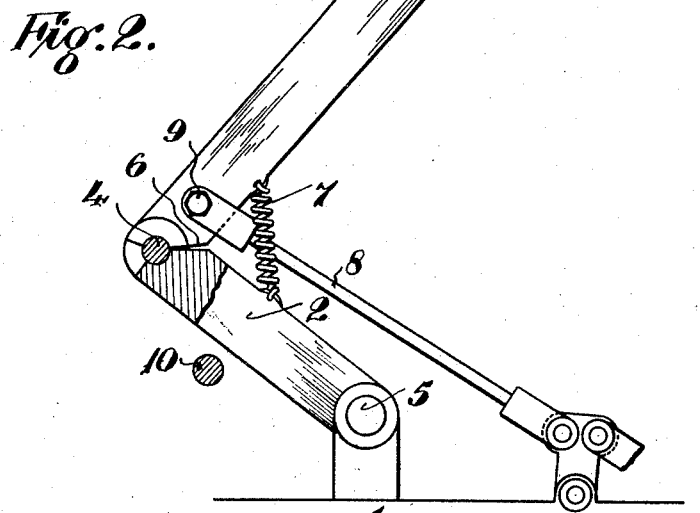
Inventor
FREDERICK HAROLD HALL
By Richards &c
Attorneys Patented Apr. 15, 1930

1,754,387

UNITED STATES PATENT OFFICE

FREDERICK HAROLD HALL, OF HOLFORD, ENGLAND

BRAKE-ACTUATING MECHANISM

Application filed August 3, 1928, Serial No. 297,347, and in Great Britain August 9, 1927.

This invention relates to pedal or hand levers for operating the brakes of motor vehicles, the said levers being of the variable leverage type adapted to give a lower leverage between the pedal or hand-lever and the brake shoe during the initial operation to enable the brake clearance and slack to be taken up with a small movement of the foot or hand, and a higher leverage when the brake shoe comes into engagement with the drum; the lever comprising two pivoted-together members one of which is the outer or operating member and which may carry the pedal or be operated by hand, while the second or inner member is pivoted at one end to the said operating member and at the other end to a suitable fixed part, the brake pull-rod or the like being attached to the operating member at a convenient distance from the pivot connection of the latter to the inner member, and the arrangement being such that during the initial operation of the pedal or handlever the two members will turn together as a single member about the lower end of the inner member as a fulcrum, but when the brake is engaged the outer or operating member will turn about the outer end of the inner member, thus increasing the leverage.

In brakes of this type as heretofore proposed it has been necessary for the outer end of the operating member to move beneath and remain in contact with a fixed abutment or constraining device arranged to prevent any outward or longitudinal movement of the said member particularly while turning about the end of the inner member, as otherwise, owing to the angle at which the brake rod has been heretofore disposed with respect to the lower or inner member, the latter would be pulled towards the brake when the latter came into operation, the outer or operating member merely turning about the brake rod as a fulcrum, so that no pressure would be applied to the brake.

Moreover, the previous arrangement has been such that the brake must always be adjusted to the same amount of clearance, as the higher leverage only comes into operation when the operating member has moved through a certain predetermined angle from its initial position.

The principal object of the present invention is to provide an improved brake-actuating device of the type referred to whereby the use of external constraining means for preventing the pulling back or return of the lower member when the brake is applied is avoided.

A further object is to insure the initial collective movement of the lever members, should the spring between them break or be omitted, without the use of constraining means.

According to the invention the lower or inner member of the lever is disposed at such an angle to the brake rod or like connection as to prevent any return movement of the lower or inner member when the brake is applied, the said member thus being inherently locked or restrained, by virtue of the relation or relative disposition of the forces acting upon it while the operating member turns about its outer end as a fulcrum.

With the arrangement hereinafter described and illustrated I have found that if the brake rod is disposed at an angle of considerably less than 35° to the longitudinal axis of the inner lever member when the brake is applied, the said inner member will be locked against return movement.

A further feature of the invention is that the angle between the members of the lever is such that an initial collective movement of the said members is insured irrespective of the presence of a spring between them.

Figure 1 of the accompanying drawings is a side elevation of the improved brake-actuating mechanism in the position it assumes when the brake is fully off.

Figure 2 is a similar view but in the position when the brake is being applied.

The pedal brake-lever shown comprises two pivoted-together members 1, 2, the outer or operating member 1 carrying the pedal 3 and being pivoted at its lower or inner end, at 4, to the upper or outer end of the member 2, the lower end of which is pivoted at 5 to a suitable fixed part. Stop surfaces are provided at 6 and the two members are normally held in the relative angular positions shown in Figure 1 by means of a spring 7 which causes the said stop surfaces to come together. The rod, cable or like coupling member 8 which operates the brake shoes is pivotedly attached at 9 to the outer or operating member 1 at a short distance from the pivot 4.

In the arrangement shown the longitudinal axis of the member 1 is at 70° to the longitudinal axis of the member 2 when the brake is off, as in Figure 1, and the angle of the brake rod 8 to the longitudinal axis of the member 2 may be about 15° or any other convenient angle when the brake is fully off, according to the amount of slack or idle movement desired, but it is necessary that, when the slack or brake clearance has been taken up and the brake commences to be applied, the angle between the members 8, 2 shall have fallen to about 8° or less.

In operation, when the pedal 3 is depressed, the members 1, 2, collectively turn as a single member about the pivot 5 until the brake clearance and slack are taken up, but when the shoes are fully applied to the drum and the rod 8 offers a sufficient resistance to the movement of the lever, the angular movement of the member 2 is arrested and the member 1 commences to turn about the pivot 4 and the pressure is applied to the brake through a greater leverage.

Owing to the angle of the brake rod to the member 2 being less than 30° when the brake is applied, the said member 2 is inherently locked or restrained against return movement in a direction toward the brake when the latter is applied.

With the angle between the members 1, 2, as shown in Figure 1, namely, approximately 70°, the initial collective movement of the said members will still be obtained even should the spring 7 break or be omitted. If, however, the angle considerably exceeds this value the initial collective movement will not be obtained should the spring break or be omitted.

If desired, a stop such as 10 may be provided for limiting the forward movement of the member 2 and starting the secondary action, so that, if due to the excessive yield or flexibility of the brake connections or of their supports, the resistance is not sufficient (even although the brakes have commenced to be applied) to start the secondary action by the time the lever reaches the stop, the said stop will then immediately cause such secondary action to take place.

Having fully described my invention, what I desire to claim and secure by Letters Patent is:—

1. A variable-leverage brake-actuating mechanism comprising a two-part lever consisting of an inner member pivoted to a fixed part and an outer operating member pivoted to the inner member, in combination with a brake-actuating member attached to the outer member of the lever, the two lever members moving together as a unit to take up slack and until the brake is engaged, and then the outer member turning relatively to the inner member, the said inner member being disposed at an angle to the brake-actuating member such as to ensure the said inner member being inherently restrained against return movement during application of the braking force without the use of supplementary external constraining means.

2. A variable-leverage brake-actuating mechanism comprising a two-part lever consisting of a lower member pivoted at its lower end to a fixed part and an upper operating member pivoted at its lower end to the upper end of the lower member, a stop device for limiting the relative angular movement of the said members, a spring acting normally to maintain the said members at a suitable angle to one another with the stop device in engagement, and a brake coupling member connected to the outer operating lever member above the pivot between the two members, the two lever members moving as one member to take up brake slack and the said brake coupling member being disposed at such an angle to the lower lever member as to ensure the upper member turning relatively to the lower member and the said lower lever member being inherently locked or restrained against return movement during applicaiton of the braking force after the brake has been engaged without the use of supplementary external constraining means.

3. A variable-leverage brake-actuating mechanism comprising a two-part lever consisting of a lower member pivoted at its lower end to a fixed part and an upper operating member pivoted at its lower end to the upper end of the lower member, a stop device for limiting the relative angular movement of the said members, a spring acting normally to maintain the said members at a suitable angle to one another with the stop device in engagement, and a brake coupling member connected to the upper operating lever member above the pivot between the two members, said coupling member being disposed at an angle of 8° or less to the lower lever member when the brake is applied, the two lever members moving together as one member to take up the brake slack, but the upper member turning about the lower member to apply the braking pressure after the brake has been engaged.

4. A variable-leverage brake-actuating mechanism comprising a two-part lever consisting of an inner member pivoted to a fixed part and an outer operating member pivoted to the inner member, a spring acting to close said members together, a stop device normally maintaining the said members at an angle of approximately 70° apart, and a brake coupling member connected to the outer operating lever member above the pivot between the two members, said coupling member being disposed at an angle not exceeding approximately 8° to the inner lever member when the brake is applied the two members moving together as one member to take up the brake slack, but the outer member turning about the inner member to apply the braking pressure after the brake has been engaged.

5. A variable-leverage brake-actuating mechanism comprising a two-part lever consisting of an inner member pivoted to a fixed part and an outer operating member pivoted to the inner member a stop device normally maintaining the said members at an angle such that an initial collective movement of the said members is obtained irespective of the employment of a spring between them and without the use of supplementary constraining means, and a brake coupling member connected to the outer operating lever above the pivot between the two members, said coupling member being disposed at an angle not exceeding approximately 8° to the inner lever member when the brake is applied, the outer member turning about the inner member to apply the braking pressure after the brake has been engaged.

6. A variable-leverage brake-actuating mechanism comprising a two-part lever consisting of an inner member pivoted to a fixed part and an outer operating member pivoted to the inner member a spring acting to close said members together, a stop device normally maintaining the said members at an approximate angle of 70° apart, and a brake coupling member connected to the outer operating lever member above the pivot between the two members, said coupling member being disposed at an angle not exceeding 8° to the inner lever member when the brake is applied, the two members moving together as one member to take up the brake slack, but the outer member turning about the inner member to apply the braking pressure after the brake has been engaged.

In testimony whereof I have affixed my signature.

FREDERICK HAROLD HALL.